3,493,630
Patented Feb. 3, 1970

3,493,630
EPOXY RESINS CURED WITH PHENOLIC NOVOLACS AND IMIDAZOLES
George A. Salensky, Metuchen, N.J., assignor to Union Carbide Corporation, a corporation of New York
No Drawing. Continuation-in-part of application Ser. No. 398,394, Sept. 22, 1964. This application Apr. 2, 1968, Ser. No. 718,207
Int. Cl. C08g 45/08
U.S. Cl. 260—831   10 Claims

ABSTRACT OF THE DISCLOSURE

This invention relates to a curing agent comprising a phenolic novolac resin and an imidazole in an amount of about 0.1 percent by weight to about 15 percent by weight based on the weight of the phenolic novolac resin and to polyepoxide compositions, containing this curing agent, which are characterized by excellent storage life and by excellent curing speed.

---

This application is a continuation in part application of my copending application Ser. No. 398,394, filed Sept. 22, 1964, now Patent No. 3,383,433.

This invention relates to expoxide curing agents and to epoxide compositions containing same. More particularly, this invention relates to epoxide curing agents which, when admixed with epoxides, provide curable epoxide compositions characterized by excellent shelf life and which, when heated to elevated temperatures, cure in a relatively short period of time to infusible products characterized by excellent physical, chemical and electrical properties.

The epoxide curing agents of this invention comprise (1) a phenolic novolac resin and (2) an imidazole.

Any substituted or unsubstituted imidazole is suitable for purposes of this invention. An imidazole is a substituted or unsubstituted five membered heterocyclic compound having 2 nitrogen atoms and 3 carbon atoms in its ring.

Among suitable imidazoles which can be specifically mentioned are the following: isoimidazole, imidazole, alkyl substituted imidazoles such as 2-methylimidazole, 2-ethyl-4-methylimidazole, 2,4-dimethylimidazole, 2-butyl-imidazole, 2-heptadecenyl-4-methylimidazole, 2-undecenylimidazole, 1-vinyl-2-methylimidazole, 2-n-heptadecylimidazole, 2-n-heptadecyl-4-methylimidazole and the like, generally wherein each alkyl substituent has a maximum of 17 carbon atoms and preferably contains a maximum of 6 carbon atoms; aryl substituted imidazoles such phenylimidazol,
benzyimidazole,
2-methyl-4,5-diphenylimidazole,
2,3,5-triphenylimidazole,
2-styrylimidazole,
1-(dodecyl benzyl)-2-methylimidazole,
2-(2-hydroxyl-4-t-butylphenyl)-4,5-diphenylimidazole,
2-(2-methoxyphenyl)-4,5-diphenylimidazole,
2-(3hydroxyphenyl)4-5-diphenylimidazole,
2-(p-dimethylaminophenyl)-4,5-diphenylimidazole,
2-(2-hydroxyphenyl)-4,5-diphenylimidazole,
di(4,5-diphenyl-2-imidazole)-benzene-1,4,
2-naphthyl-4,5-diphenylimidazole,
1-benzyl-2-methylimidazole,
2-p-methoxystyrylimidazole and the like generally wherein each aryl substituent has a maximum of 10 carbon atoms and preferably wherein each aryl substituent has a maximum of 8-carbon atoms.

The novolac resins are well known products usually acid-catalyzed phenol-aldehyde condensates or acid catalyzed phenol-ketone condensates which are prepared by condensing a phenol and an aldehyde or ketone in the presence of an acid such as oxalic acid, sulfuric acid and the like or in the presence of a metal salt of an acid such as zinc acetate wherein the phenol is present in the reaction mixture in more than stoichiometric amounts. Novolac resins are generally fusible, brittle, grindable resins which can be converted to the infusible state by the addition thereto of a crosslinking agent such as a methylene generating agent for example hexamethylenetetramine.

Illustrative of suitable phenols which can be condensed with an aldehyde or ketone to produce suitable condensation products can be noted: phenol; dihydric phenols such as resorcinol; substituted phenols such as the alkylated phenols exemplary of which are m-cresol, o-cresol, m-ethylphenol, m-n-propylphenol, m-isopropylphenol, m-n-hexylphenol, m-n-butylphenol, m-sec-butyl phenol, m-tert-butyl phenol, m-amyl phenol and other like phenols, particularly those wherein the alkyl substituent contains from 1 to 6 carbon atoms inclusive, as well as the commercially available meta-cresol which contains small amounts of both the para and the ortho isomers; meta-substituted alkoxy phenols such as m-methoxy phenol, m-ethoxy phenol, m-n-propoxy phenol and the like, particularly those wherein the alkoxy group contains from 1 to 6 carbon atoms inclusive; meta-halogenated phenols such as m-chloro phenol, m-bromo phenol and the like. Also suitable are 2,2-bis(p-hydroxyphenyl)propane, bis(p-hydroxyphenyl)sulfone and the like.

Examples of aldehydes which can be condensed with the phenols listed above to produce the phenol-aldehyde condensates are: formaldehyde in any of its available forms, i.e., formalin, paraformaldehyde, furfural and the like, glyoxal and the like, acrolein and the like, benzaldehyde and the like.

Examples of suitable ketones are acetone, methylethyl ketone, acetophenone and the like.

For a detailed discussion of condensates produced from a phenol and an aldehyde or ketone, methods for the production thereof, and suitable reactants, reference is made to the books: "Phenoplasts" by T. S. Carswell, published in 1947 by Interscience Publishers and "Chemie der Phenolharze" by K. Hultzsch, Springer Verlag, 1950, which are incorporated herein by reference.

Particularly desirable phenol-aldehyde condensates are those prepared by condensing formaldehyde with a phenol having the formula:

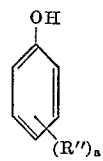

wherein $a$ is an integer having a value of 0 to 1 inclusive and R″ is a halogen atom, i.e., chlorine, bromine, iodine or fluorine, or an alkyl radical containing from 1 to 6 carbon atoms inclusive or an alkoxy radical containing from 1 to 6 carbon atoms inclusive.

In formulating the epoxide curing agents of this invention, the imidazole is simply admixed with the novolac resin in amounts of about 0.1 part by weight to about 15 parts by weight and preferably about 1.5 parts by weight to about 5 parts by weight per 100 parts by weight novolac.

The formulation of the curable epoxide compositions of this invention is conveniently accomplished by preparing the curing agent and adding the curing agent to the desired epoxide. Dry blending the individual powdered components can also be done if so desired.

The amount of curing agent used is sufficient to provide about 0.5 to about 1.5 phenolic hydroxyl groups per epoxide equivalent.

In those instances wherein the resultant epoxide composition is to be used in molding applications, the curing agent, epoxide and suitable filler are admixed to form a blended composition which is compacted at room temperature and then granulated to the desired size. The granulated epoxide composition can then be molded to form such shaped articles as coil forms, capacitors, terminal blocks and the like.

As a rule, the filler which can be organic or inorganic such as nylon fiber, carbon black, silica, barytes, slate flour, clay and the like is used in amounts of about 30 to 80 percent by weight, based on the total weight of the composition. Also, mold release agents, colorants and the like can be added to the compositions.

The epoxide compositions are curved by heating to temperatures of about 125° C. to about 175° C. for 2 hours. Room temperature curing, which takes a number of days, is not practical.

The epoxides which can be utilized in accordance with this invention are those epoxides having more than one glycidyl group per molecule. These compounds, wherein the oxygen of the epoxy group is attached to vicinal carbon atoms, can be saturated or unsaturated, aliphatic, cycloaliphatic or heterocyclic and can be substituted with substituents such as halogen atoms, alkyl groups, ether groups and the like.

Illustrative of suitable epoxides are the polyglycidyl ethers of polyhydric phenols, exemplified by the polyglycidyl ethers of such phenols as the mononuclear polyhydric phenols, resorcinol and pyrogallol, the di- or polynuclear phenols, such as the bisphenols described in Bender et al., U.S. Patent 2,506,486 and polyphenylols such as the novolac condensates of a phenol and a saturated or unsaturated aldehyde containing an average of from 3 to 20 or more phenylol groups per molecule (cf. "Phenoplasts" by T. S. Carswell, published 1947 by Interscience Publishers, New York). Exemplary of suitable polyphenylols derived from a phenol and an unsaturated aldehyde such as acrolein are the triphenylols, pentaphenylols, and heptaphenylols described in U.S. Patent 2,885,385 to A. G. Farnham. The phenols may contain substituents such as alkyl or aryl ring substituents or halogens, as exemplified by the alkyl resorcinols, tribromoresorcinols and the diphenols containing alkyl and halogen substituents on the aromatic ring (Bender et al., U.S. Patent 2,506,486). The polyhydric polynuclear phenols can consist of two or more phenols connected by such groups as methylene, alkylene or sulfone. The connecting groups are further exemplified by bis(p-hydroxyphenyl)methane, 2,2-bis(p-hydroxyphenyl)propane and dihydroxydiphenyl sulfone.

Process for the preparation of polyglycidyl ethers of polyhydric phenols is described in detail in the Bender et al. patent (supra) and U.S. Patent 2,943,095 to A. G. Farnham et al.

Particularly desirable for purposes of this invention are the polyglycidyl ethers of the bis(hydroxyphenyl)alkanes, for example the diglycidyl ether of 2,2-bis(p-hydroxyphenyl)propane and the diglycidyl ether of bis(p-hydroxyphenyl)methane. Other suitable polyglycidyl ethers of polyhydric phenols are enumerated in U.S. Patent 2,633,458 to E. C. Shokal.

Also suitable are the polyglycidyl ethers of polyhydric alcohols, such as the reaction products of epichlorohydrin and aliphatic compounds containing from two to four alcoholic hydroxyl groups, such as ethylene glycol, propane diols, butane diols, glycerine, hexane triols and the like. (Methods of preparing polyglycidyl ethers of polyhydric alcohols are described in U.S. Patent 2,898,349 to P. Zuppinger et al.)

Other suitable polyglycidyl compounds are the polyglycidyl esters of polycarboxylic acids, such as the polyglycidyl esters of adipic acid, phthalic acid and the like. Polyglycidyl esters of polycarboxylic acids are described in detail in U.S. Patent 2,870,170 to Payne et al. Also suitable are polyglycidyl compounds produced by reacting epichlorohydrin with aromatic amines, such as aniline, 2,6-dimethyl aniline, p-toluidine, m-chloroaniline, p-aminodiphenyl methane, or with amino phenols, such as p-amino phenol, 5-amino-1-n-naphthol, 4-amino resorcinol, 2-methyl - 4 - amino phenol, 2-chloro-4-amino phenol and the like. Specific compounds include, among others, N,N-diglycidyl aniline, N,N-diglycidyl-2,6-dimethyl aniline, N,N,N',N'-tetraglycidyl-4,4'-diamino diphenyl methane, the triglycidyl derivative of p-amino phenol wherein the amino-hydrogen and OH hydrogen atoms are replaced by glycidyl groups.

Polyglycidyl derivatives of aromatic amines and amino phenols and methods for their preparation are further described in U.S. Patents 2,951,825 and 2,951,822 to N. H. Reinking and N. H. Reinking et al., respectively.

It is to be understood that all patents and literature references referred to in this specification are incorporated herein by reference.

The following examples further illustrate the present invention and are not intended to limit the scope thereof in any manner.

EXAMPLE 1

This example illustrates the excellent shelf life of epoxide compositions containing the curing agents of this invention.

Composition A

| Resin portion: | Parts by weight |
|---|---|
| Epoxidized phenol-formaldehyde condensate formed by reacting epichlorohydrin with a phenolformaldehyde novolac resin having a molecular weight of about 600 and having 6 phenolic hydroxyl groups per molecule | 100 |
| Silica flour | 75 |
| Calcium stearate | 1 |
| Curing agent: | |
| Phenol-formaldehyde novolac resin | 41 |
| 2-methyl imidazole | 0.75 |
| Silica flour | 25 |
| Calcium stearate | 1 |

Each portion noted above was prepared separately by blending the ingredients using a mechanical agitator. Each portion was then micropulverized through a 3/32 inch screen and the pulverized portions blended using a rotating container. The composition was cold sintered using a Strokes preformer with a 2 inch die operating at a pressure of 20 tons. The sintered composition was then granulated to approximately a 12 mesh size in an Abbé mill.

Control 1.—This composition was prepared in identically the same manner as Composition A using the same materials, with the exception that methylene dianiline was used in lieu of the curing agent.

Composition A and Control 1 were tested in order to determine their relative cure speeds. The results of the tests are indicated below wherein a higher numerical ratio indicates that the composition being tested has advanced more closely to the infusible state.

The phenol-formaldehyde novolac resin referred to in this example was oxalic acid catalyzed, had a molecular weight of about 600 and had 6 phenolic hydroxyl groups per molecule.

This phenol-formaldehyde resin was epoxidized by reaction with epichlorohydrin in a manner described in U.S. Patent 2,943,095. This epoxidized novolac, noted in this example, had a molecular weight of about 1400 and an an epoxy equivalent weight of about 211.

| Number of Days Aged at 40° C. | Ratio* Composition A | Control 1 |
|---|---|---|
| 0 | | |
| 7 | 2.0 | 4.7 |
| 14 | 2.2 | 5.6 |
| 34 | 2.8 | 6.9 |
| 48 | 3.1 | 8.0 |

* Ratio = Plasticity of composition aged at 40° C. for the time indicated/ plasticity of composition 4 hours after preparation.
NOTE.—Plasticity = Time in seconds for a 2 inch ASTM D-731-50 cup with a 10 percent fixed over charge to close to a flash thickness of 8 mils when under a pressure of 4 kilo pounds and at a temperature of 160° C.

EXAMPLE 2

This example illustrates the fast cure speeds of the compositions of this invention effected by means of the curing agents. Cure speed was determined by means of "gel" time. This test was conducted by: placing a one gram sample of the desired composition on a hot plate which was at a temperature of 150° C. Each composition was stroked with a spatula and the time required to reach a "no string" conditioned noted. A "no string" condition is reached when there is no pulling of strings of material, by the spatula, from the main body of the composition. This time was noted as the initial gel time. Stroking of each composition was continued and the time at which the composition reached a "no noise" condition noted. This condition was reached when there was no audible noise on stroking of the composition. This time was noted as the final gel point. A spread of less than 10 seconds between the initial and the final gel time indicates a fast cure.

In each instance, compositions were formulated by admixing an epoxide (described in Example 1), a phenolformaldehyde novolac (described in Example 1) and various imidazoles using the following relative amounts of materials: 12 parts by weight imidazole per 100 parts by weight novolac and 0.8 parts by weight novolac per epoxide equivalent.

Composition B

| | Gel time (seconds) |
|---|---|
| 2-methylimidazole | 7–7 |

Composition C

| | |
|---|---|
| 4-methyl-2-ethylimidazole | 30–33 |

Composition E

| | |
|---|---|
| Benzimidazole | 22–29 |

In order to further indicate the "fast cure" effected using the curing agents of this invention, Control 2 was formulated containing the same equivalent weight phenolformaldehyde novolac resin and epoxide. This composition was the same as Compositions B–E with the exception that it did not contain any heteroclic nitrogen compound. This composition was also subjected to the "gel" test. It took 13 minutes for this composition to reach the "no string" condition. After a total of 23 minutes, this composition still had not reached the "no noise" condition.

EXAMPLE 3

This example again illustrates the excellent shelf life effected using the curing catalysts of this invention and also the excellent cure speed at elevated temperatures.

Compositions were formulated in a manner described in Example 1 using the materials indicated below.

Control 3: Parts by weight
   Epoxide-phenylglycidyl ether _____ 100
   Phenol _____ 50
Control 4:
   Epoxide-phenylglycidyl ether _____ 100
   Phenol _____ 50
   Methylene bisdimethylaniline _____ 3

Composition F

Epoxide-phenylglycidyl ether _____ 100
Phenol _____ 50
2-methyl imidazole _____ 1

The "reactivity" of each composition was determined by the disappearance of the epoxy groups and reported on the basis of one epoxy group per gram mole.

| Time Elapsed | Control 3 | | | Control 4 | | | Composition F | | |
|---|---|---|---|---|---|---|---|---|---|
| | 25° C. | 40° C. | 100° C. | 25° C. | 40° C. | 100° C. | 25° C. | 40° C. | 100° C. |
| 0 | 225.5 | | | 234 | | | 228 | | |
| ½ hour | | | 232 | | | 670 | | | 705 |
| 1 hour | | | 227 | | | 1,110 | | | 2,500 |
| 2 days | 225.5 | 235 | | 297 | 736 | | 263 | 475 | |
| 6 days | 225.5 | 227 | | 440 | 1,440 | | 332 | 1,815 | |

EXAMPLE 4

In order to further illustrate the excellent properties of the compositions of this invention, various tests were conducted using Composition A and Control 1. Results are tabulated as follows:

| Tests | Control 1 | Composition A |
|---|---|---|
| Heat distortion ASTM D-648-56, ° F | 280 | 350 |
| Izod impact ASTM D-256-56, ft.-lb./inch | 0.35 | 0.33 |
| Flexural strength ASTM D-790-58T, p.s.i | 8,400 | 11,348 |
| Flexural modulus ASTM D-790-58T, p.s.i | 9.0×10⁵ | 12.6×10⁵ |
| Rockwell hardness (M scale) ASTM D-785-60T | 101 | 99 |
| Mold shrinkage (inch/inch) ASTM D-955 | 0.0106 | 0.0066 |
| Gravimetric loss at 400° F. for 100 hrs. (¼ inch by ½ inch by 5 inches—bar), percent | 2.6 | 0.35 |
| AMOE 320° F.—2 mins., p.s.i | 7,000 | 17,000 |

AMOE—Apparent modulus of elasticity—was carried out by molding a bar ⅛ inch by 1 inch by 5 inches at 320° F. under a molding cycle of 2 minutes, at 1,000 p.s.i. pressure. The bar was then discharged directly into a flexural test jig affixed to the molding press, and the stress-strain flexural curve obtained. The slope of the stress-strain flexural curve is reported as AMOE.

As indicated by the AMOE results, the characteristics of this invention have excellent hot stiffness.

In order to further demonstrate the excellent properties of the compositions of this invention, compositions of this invention were prepared and the cure speeds thereof were determined and compared to the cure speeds of compositions containing hexamethylenetetramine in lieu of the imidazole. The formulation of the compositions is set for below in parts by weight. The preparation of these compositions was carried out in a manner as described for Composition A using the epoxidized novolac and phenolic novolac of Composition A.

| | Compositions | | | |
|---|---|---|---|---|
| | G | Control 5 | Control 6 | Control 7 |
| Epoxidized Novolac | 100 | 100 | 100 | 100 |
| Silica Flour | 75 | 75 | 75 | 75 |
| Calcium Stearate | 1 | 1 | 1 | 1 |
| Phenolic Novolac | 42 | 42 | 42 | 43 |
| 2-methyl Imidazole | 0.75 | | | |
| Hexamethylenetetramine | | 0.75 | 1.5 | 5.5 |
| Silica Flour | 26 | 26 | 26.2 | 29 |
| Calcium Stearate | 1 | 1 | 1 | 1 |

The cure speed of these compositions was determined with relation to their Shore D Hardness. A composition having a Shore D Hardness of 50 or greater had sufficiently cured to allow for proper handling. A composition having a Shore D Hardness of less than 50 was flabbly and easily damaged on being discharged from the molding press.

compositions of this invention, as compared to compositions based on hexamethylenetetramine have significantly better shelf life. This is established by the data appearing below wherein shelf life was determined by the spiral flow test.

| | Compositions | | | | | | | |
|---|---|---|---|---|---|---|---|---|
| | G | | Control 5 | | Control 6 | | Control 7 | |
| Storage Temperature | 25° C. | 40° C. | 25° C. | 40° C. | 25° C. | 40° C. | 25° C. | 40° C. |
| Initial Flow * | 20½ | 20½ | 60½ | 60½ | 43 | 43 | 22¾ | 22¾ |
| Flow after 1 week | 21 | 17¾ | 54 | 27 | 41 | 22 | 21½ | 14 |
| Flow after 2 weeks | 22 | 15 | 55 | 24 | 40 | 20 | 20½ | 13½ |
| Flow after 3 weeks | 22 | 13¼ | 52 | 23 | 35 | 19 | 20 | 13 |
| Flow after 4 weeks | 21 | 13 | 50 | 21 | 31¼ | 18 | 17¾ | 12 |
| Percent Reduction in Flow after 4 weeks | 0 | 37 | 17 | 65 | 17 | 58 | 22 | 47 |

* Spiral Flow in inches. Molded at 315° F. for 2 min. at 1,000 p.s.i.
NOTE.—Spiral Flow Test described in detail in the Society of the Plastics Industry pamphlet EMM 11-66.

CURE TIME (SECS.) VS. HOT SHORE D HARDNESS

| | Compositions | | | |
|---|---|---|---|---|
| | G | Control 5 | Control 6 | Control 7 |
| Molding Time * (secs.): | | | | |
| 35 | 16 | | | |
| 60 | 30 | | | |
| 90 | 51 | 4 | | 25 |
| 120 | 60 | | | 34 |
| 230 | 71 | | | 50 |
| 300 | 75 | | 20 | 57 |
| 600 | | | 30 | 35 |
| 1,000 | | 48 | | |
| 1,200 | | | | 65 |
| 1,800 | | 65 | | |

* Molding Time (secs.) 1,000 p.s.i. at 315° F.
NOTE.—Specimen Size ¼ x ½ x 5 inches. Shore D readings made on bars immediately opening of the press.

The results of the cure speed test clearly establish that whereas a composition containing 0.75 part by weight of 2-methyl imidazole per 100 parts by weight of epoxidized novolac cured to a Shore D Hardness in an acceptable time of 90 seconds, an identical composition, with the exception that it contained hexamethylenetetramine in lieu of the 2-methylimidazole required ten times more time, an impractical 1000 seconds, in order to cure to a Shore D Hardness of 50. It was necessary to use 7.5 times more hexamethylenetetramine than 2-methyl imidazole to even approach the cure speed of the imidazole system. When 5.5 parts by weight hexamethylenetetramine were used it required 230 seconds in order to reach a Shore D Hardness of 50.

Further proof of the unique properties of the compositions of this invention, as compared to compositions based on hexamethylenetetramine is shown by the data below relating to the heat distortion temperatures of these compositions. Composition H had a heat distortion temperature of 142.4° C. whereas a composition containing an identical level of hexamethylenetetramine (Control 5) had a heat distortion of temperature of only 80° C. Even 7.5 times more hexamethylenetetramine (Control 7) yielded a composition having a heat distortion temperature of 114.6° C. Heat distortion temperature is an important property with respect to epoxy molding compositions since these systems find use in applications wherein relatively high temperatures are encountered.

Heat distortion temperature (ASTM D-648-56)

Composition: ° C.
G _____ 142.4
Control 5 _____ 79.8
Control 6 _____ 81.9
Control 7 _____ 114.6

In addition to having significantly better cure speed and significantly higher heat distortion temperatures, the spiral flow data establishes the significantly better shelf life of the compositions of this invention as evidenced by the smaller percentage reduction in spiral flow after storage for one month at 25° C. and at 40° C. as compared to compositions based on hexamethylenetetramine.

What is claimed is:

1. A curable composition comprising an epoxide having more than one glycidyl group per molecule and in an amount sufficient to provide about 0.5 to about 1.5 phenolic hydroxyl groups per epoxide equivalent, a curing agent consisting essentially of a phenolic novolac resin and an imidazole in an amount of about 0.1 part by weight to about 15 parts by weight per 100 parts by weight of the said novolac resin.

2. The cured product of the composition defined in claim 1.

3. A curable composition as defined in claim 1 wherein the imidazole is 2-methylimidazole.

4. A curable composition as defined in claim 1 wherein the imidazole is 4-methyl-2-ethylimidazole.

5. A curable composition as defined in claim 1 wherein the imidazole is imidazole.

6. A curable composition as defined in claim 1 wherein the epoxide is a polyglycidyl ether of bisp-hydroxyphenyl)alkane.

7. A curable composition as defined in claim 1 wherein the epoxide is diglycidylether of 2,2-bis(p-hydroxyphenyl)propane.

8. A curable composition as defined in claim 1 wherein the epoxide is the polyglycidylether of an acid-catalyzed phenol-formaldehyde resin.

9. A curable composition as defined in claim 1 wherein the novolac resin is a phenol-formaldehyde resin.

10. A curing agent for epoxides consisting essentially of a phenolic novolac resin and an imidazole in an amount of about 0.1 percent by weight to about 15 percent by weight based on the weight of the phenolic novolac resin.

References Cited

UNITED STATES PATENTS 3,147,705  9/1964  Broderick _____ 260—23
3,200,172  8/1965  Renner _____ 260—831

OTHER REFERENCES

Houdry Process Corp., Imidazoles.

MURRAY TILLMAN, Primary Examiner

P. LIEBERMAN, Assistant Examiner

U.S. Cl. X.R.

260—2, 19, 37, 38, 47